(12) United States Patent
Botha

(10) Patent No.: US 11,003,407 B2
(45) Date of Patent: May 11, 2021

(54) MEDIA TRANSFER SYSTEM

(71) Applicant: Canon Europa N.V., Amstelveen (NL)

(72) Inventor: Deon Botha, London (GB)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 16/039,185

(22) Filed: Jul. 18, 2018

(65) Prior Publication Data

US 2019/0026054 A1 Jan. 24, 2019

(30) Foreign Application Priority Data

Jul. 20, 2017 (EP) ..................................... 17182385

(51) Int. Cl.
*H04L 29/06* (2006.01)
*G06F 3/12* (2006.01)
(Continued)

(52) U.S. Cl.
CPC .......... *G06F 3/1268* (2013.01); *G06F 3/1236* (2013.01); *G06F 3/1238* (2013.01); *G06F 16/95* (2019.01); *G06Q 30/0621* (2013.01); *H04L 65/1069* (2013.01); *H04L 65/40* (2013.01); *H04L 67/02* (2013.01); *H04L 67/06* (2013.01); *H04L 67/12* (2013.01); *H04L 67/146* (2013.01); *H04N 1/00132* (2013.01); *H04N 1/00148* (2013.01); *H04N 1/00177* (2013.01); *H04N 1/00217* (2013.01); *H04W 4/80* (2018.02); *G06F 3/1274* (2013.01)

(58) Field of Classification Search
CPC ....... H04L 67/02; H04L 67/06; H04L 67/146; H04L 67/2814; H04L 43/08; H04L 67/141; H04L 65/1069; H04L 67/12; H04L 65/40; G06F 17/2235; G06F 3/04817; G06F 3/1268; G06F 3/1236; G06F 3/1238; G06F 3/1274; G06F 16/95; G06Q 30/00; G06Q 30/0635; G06Q 30/0621; H04N 1/00217; H04N 1/00132; H04N 1/00177; H04N 1/00148; H04W 4/80

See application file for complete search history.

(56) References Cited

U.S. PATENT DOCUMENTS

2005/0289018 A1* 12/2005 Sullivan ................. G06Q 30/00
705/26.5
2009/0257091 A1 10/2009 Shelton
(Continued)

FOREIGN PATENT DOCUMENTS

WO 2011075825 A1 6/2011

*Primary Examiner* — Jungwon Chang
(74) *Attorney, Agent, or Firm* — Canon U.S.A., Inc. IP Division

(57) ABSTRACT

The present invention related to a media transfer system comprising a user terminal and a network storage device communicable over a network. The user terminal is adapted to provide a network address and a session ID identifying the network storage device to a mobile device. The network storage device is adapted to receive media data from a mobile device under the session ID. The user terminal is adapted to interrogate the network storage device and download any media data uploaded under the given session ID, provide a customisation interface to allow the user to customise a product with any downloaded media, and upload the customised product design to the network storage device.

10 Claims, 8 Drawing Sheets

(51) Int. Cl.
*H04L 29/08* (2006.01)
*H04N 1/00* (2006.01)
*G06F 16/95* (2019.01)
*H04W 4/80* (2018.01)
*G06Q 30/06* (2012.01)

(56) References Cited

U.S. PATENT DOCUMENTS

| | | | |
|---|---|---|---|
| 2012/0124365 A1* | 5/2012 | Black | G07F 7/00 |
| | | | 713/150 |
| 2014/0181256 A1* | 6/2014 | Trifa | H04L 67/2814 |
| | | | 709/218 |
| 2014/0325328 A1* | 10/2014 | Beadles | G06F 16/955 |
| | | | 715/208 |
| 2015/0269388 A1 | 9/2015 | Christmas | |
| 2015/0310520 A1* | 10/2015 | Donato | G06Q 30/0237 |
| | | | 705/14.12 |
| 2016/0098783 A1* | 4/2016 | Margalit | G06Q 30/0635 |
| | | | 705/26.5 |
| 2017/0131855 A1* | 5/2017 | Svendsen | G06F 3/04817 |
| 2018/0247287 A1* | 8/2018 | Narasimhan | G06Q 20/16 |
| 2018/0253718 A1* | 9/2018 | Khan | G06Q 30/0226 |

* cited by examiner

MEDIA TRANSFER SYSTEM

CROSS-REFERENCE TO RELATED APPLICATION

The present application claims the benefit of European Patent Application No. 17182385.9 filed Jul. 20, 2017, of which is hereby incorporated by reference herein in its entirety.

TECHNICAL FIELD

The present invention relates to a media transfer system and a method of transferring media. In particular the present invention relates to the transfer and management of image data over a network for customised product printing.

BACKGROUND

Since the advent of digital photography, and the rise in popularity of smart phones incorporating a digital camera, the number of photographs taken each year continues to increase. With this rise, the demand for photo prints, or other customisable products incorporating photos (such as t-shirts, mouse-mats, mugs, keyrings, posters, placemats, etc.) has also risen.

Systems and methods exist for transferring media (e.g. image data) for printing, either as photo prints or customised products. However, in order to transfer the desired image data to a user terminal for print ordering and/or product customisation, they often rely upon a direct network connection being established between the media source (e.g. a mobile device) and the kiosk (e.g. user terminal). Typically, such a communication channel is achieved through either a wired connection, Bluetooth, Wi-Fi or memory card transfer. However it can often be difficult to achieve such a connection owing to conflicting operating systems, incompatible ports, and ever-changing communication protocols and standards.

Accordingly, there is a need to provide a media transfer system and a method of transferring media that makes it easier and more secure for a user to be able to retrieve media (i.e. image data) from a mobile device over a network.

SUMMARY

According to a first aspect of the present invention there is provided a media transfer system comprising: a user terminal; and a network storage device, wherein the user terminal and network storage device are communicable via a network, wherein the user terminal is adapted to display: a network address for the network storage device; and session ID,
wherein the network storage device is adapted to receive media data from a mobile device in association with the session ID, and wherein the user terminal is adapted to: interrogate the network storage device and download any media data uploaded under the given session ID; provide a customisation interface to allow a user to customise a product with any downloaded media data; and upload the customised product design to the network storage device.

An advantage of the present invention is that a user may securely submit media data for use on the user terminal without the need to establish a direct network connection between the mobile device and the user terminal.

In some embodiments, the media transfer system comprises a printing device communicable over the network, wherein the printing device is adapted to receive the customised product design from the network storage device using a given session ID, and print the customised product.

In some embodiments the network address comprises a URL.

In some embodiments, the network address and session ID are displayed in a machine-readable code. Optionally, the network address and session ID may be provided in a barcode code format.

The media transfer system may further comprise the mobile device, the mobile device comprising an application for reading the machine readable code and a file transfer function for uploading media data to the network storage device.

In some embodiments, the data transfer via the network may be encrypted.

According to a second aspect of the present invention there is provided a user terminal for a media transfer system, the user terminal adapted to: generate and display a network address and unique session ID; interrogate a network storage device corresponding to said network address and session ID for any uploaded media; download any uploaded media matching the given session ID; provide a customisation interface for a product design incorporating the any downloaded media; and upload the customised product design to a network storage device.

According to a third aspect of the present invention there is provided a method of transferring media via a network, the method comprising: generating, at a user terminal, session ID; displaying, by said user terminal, a network address of a network storage device and the generated session ID for reading by a mobile device; uploading, from said mobile device, media data to said network address in association with said session ID; interrogating, by said user terminal, the network storage device for any uploaded media data; downloading, by said user terminal, any uploaded media data matching the given session ID from the network storage device; providing, at said user terminal, a customisation interface for a product design incorporating the any downloaded media data; and uploading the customised product design from the user terminal to a network storage device.

According to a fourth aspect of the present invention there is provided a non-transitory computer readable medium storing a program causing a computer to carry out the following instructions: generate a session ID; provide a network address of a network storage device and the generated session ID to a user; interrogate the network storage device for any uploaded media stored in association with the session ID; download any uploaded media matching the given session ID; provide a customisation interface for a product design incorporating the any downloaded media; and upload the customised product design to a network storage device.

BRIEF DESCRIPTION OF THE DRAWINGS

Embodiments will now be described, with reference to the accompanying drawings, in which.

DETAILED DESCRIPTION

In one example of the present invention, a user uploads photos from a mobile device, and uses an in-store kiosk/self-service point of sale (PoS) device to order photo-customised products from the store for check-out, printing and delivery via a third-party mechanism.

Figure 1:
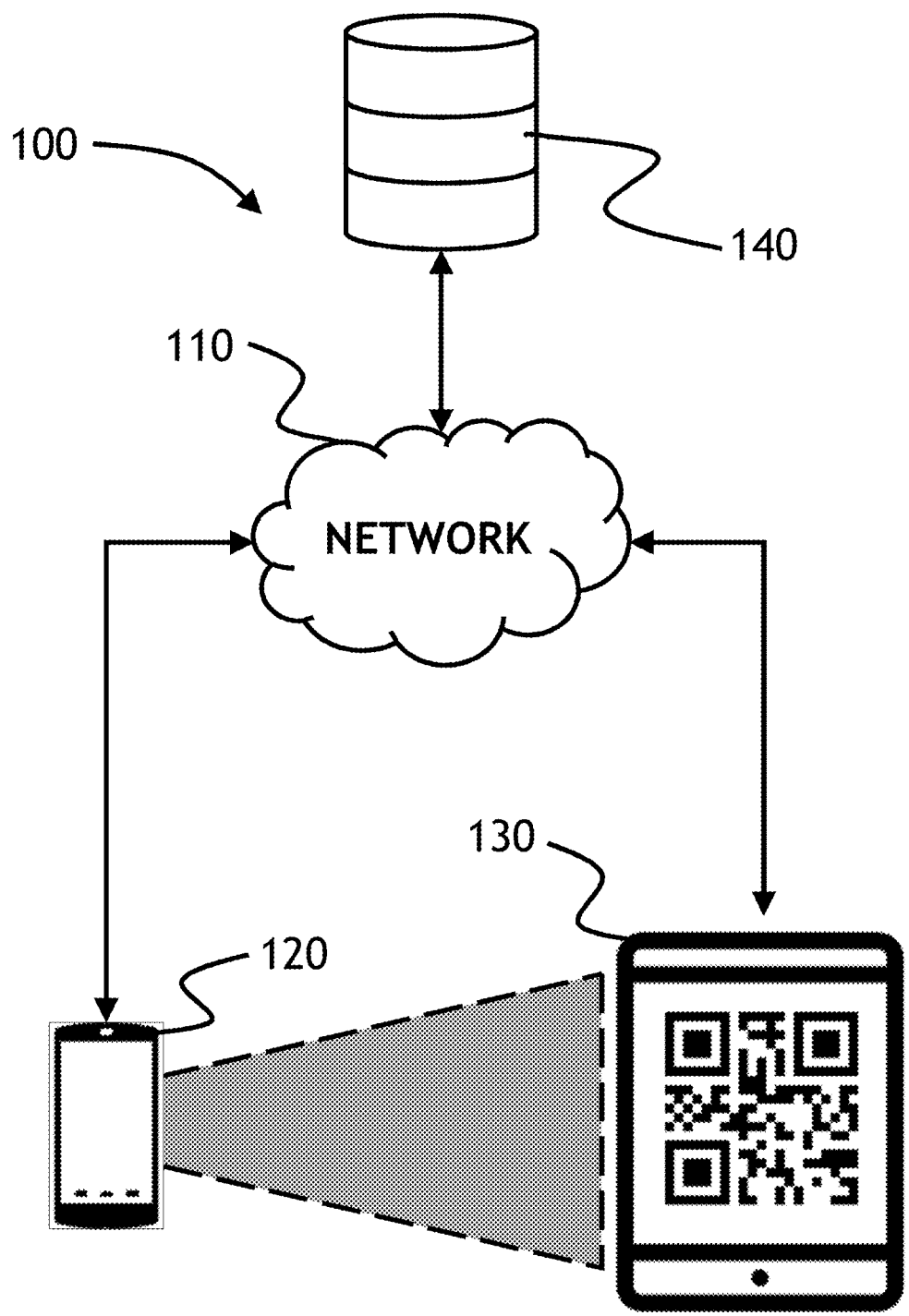
FIG. 1 is a schematic diagram of a media transfer system according to a first embodiment.

FIG. 1 shows a media transfer system 100, the system having a user terminal 130 and a network storage device 140 communicable over a network 110. In one example, the user terminal (130) is a kiosk or self-service "PoS" device in a shop.

FIG. 1 also shows a mobile device 120 having access to the network 110. The mobile device 120 may access the network 110 via cellular or Wi-Fi connections.

Figure 2:
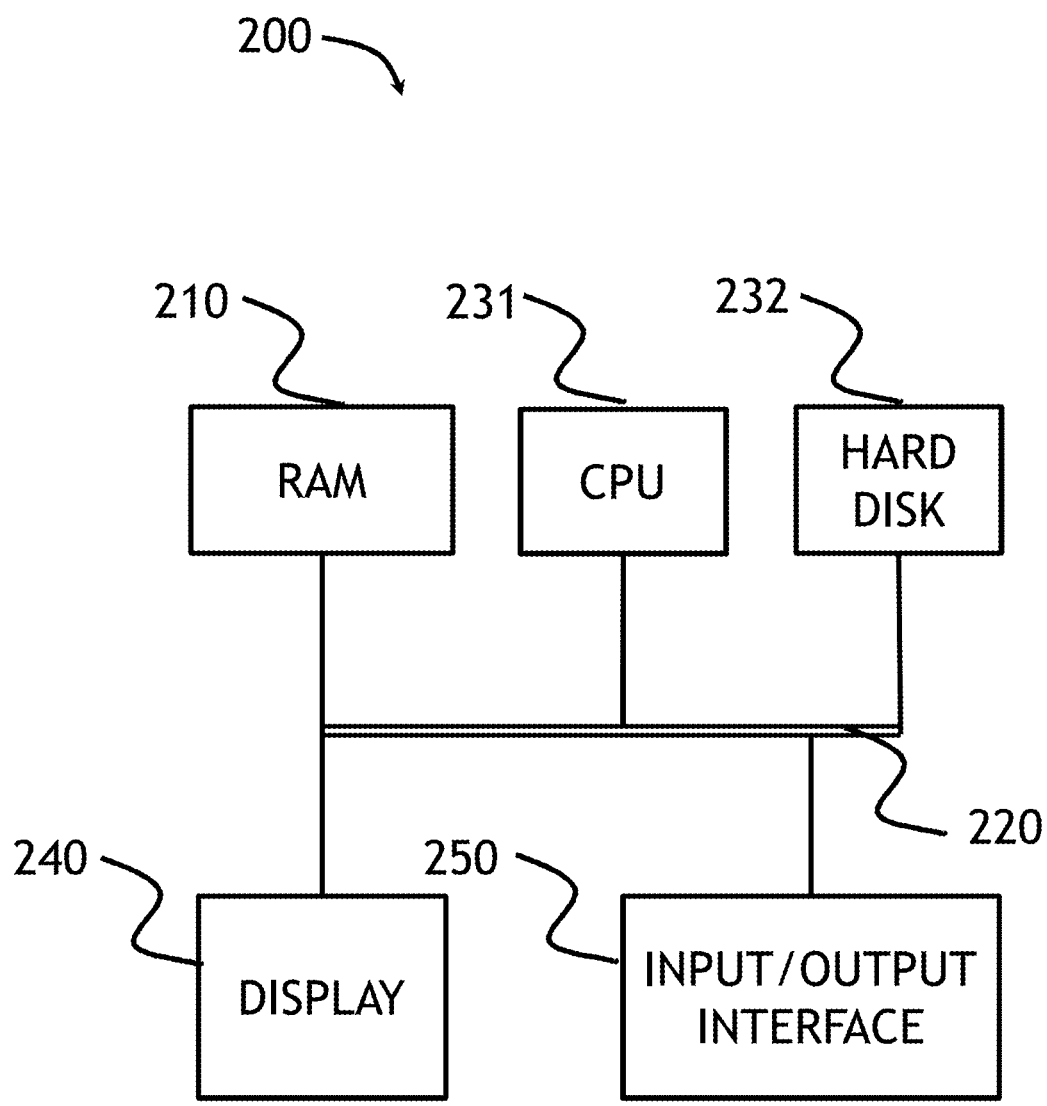
FIG. 2 shows the hardware configuration of a computer.

The mobile device 120 and user terminal 130 are computers. FIG. 2 shows a typical arrangement for a computer 200. The computer 200 comprises a communication bus 220 to which there are preferably connected:

a central processing unit 231, such as a microprocessor, denoted CPU;

a random access memory 210, denoted RAM, for storing the executable code of methods according to embodiments of the invention as well as the registers adapted to record variables and parameters necessary for implementing methods according to embodiments of the invention; and an input/output interface 250 configured so that the computer 200 can communicate with other devices.

Optionally, the computer device 200 may also include a data storage means 232 such as a hard disk for storing data and a display 240.

The executable code loaded into the RAM 210 and executed by the CPU 231 may be stored either in read only memory (not illustrated), on the hard disk 232 or on a removable digital medium (not illustrated).

The display 240 is used to convey information to the user typically via a user interface. The input/output port 250 allows a user to give instructions to the computer 200 using a mouse and a keyboard, receives data from other devices, and transmits data via the network.

The mobile device 120 and user terminal 130 have a system architecture consistent with the computer 200 shown in FIG. 2. The description of FIG. 2 is greatly simplified and any suitable computer architecture may be used. In addition to the architecture shown in FIG. 2, the mobile phone is further provided with a digital camera for imaging, a speaker and a microphone (not illustrated).

The network storage device 140 has a typical server architecture, similar to that shown in FIG. 2. Alternatively, the network storage device may be implemented as a cloud service. In both cases, the functions of the network storage device are implemented by computer code executed by computer processors.

Figure 3:
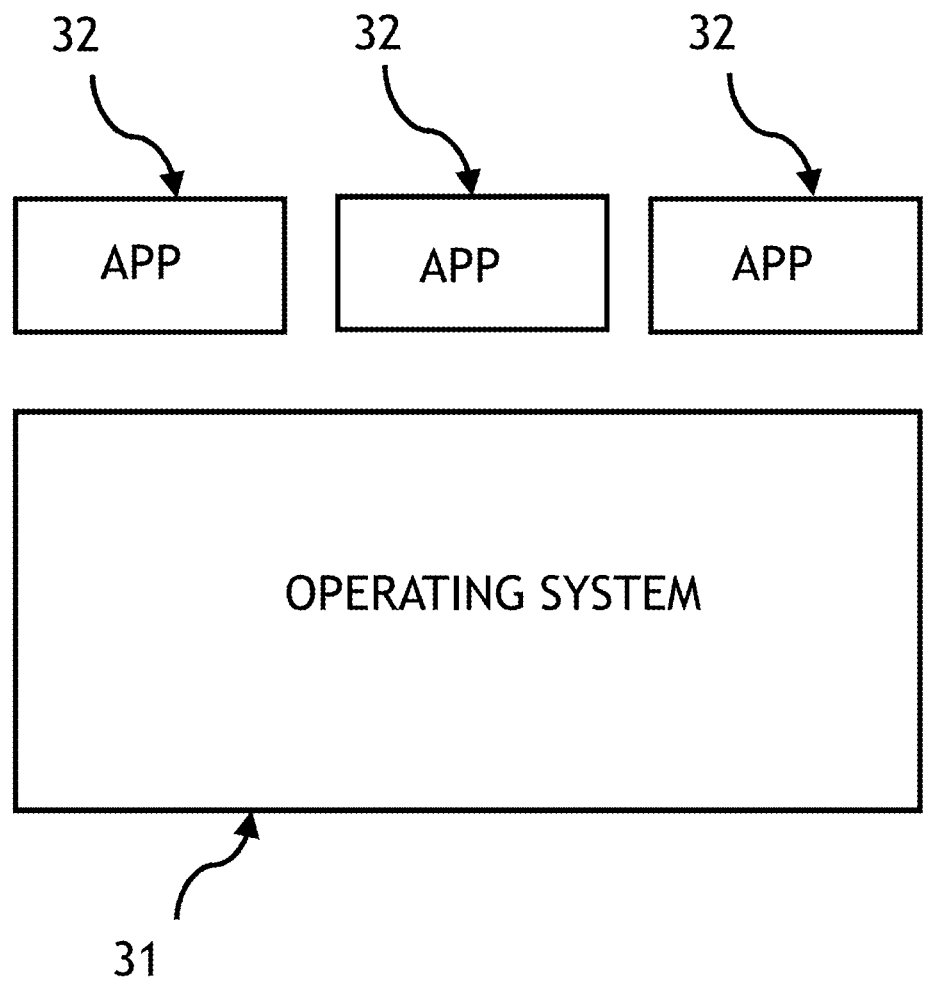
FIG. 3 shows software architecture of a mobile device.

FIG. 3 shows a software architecture on the mobile device 120. The software architecture comprises an operating system 31 and a plurality of applications 32 installed on the mobile phone. The operating system 31 may be, for example, one of Android® operating system by Google® or IOS® operating system by Apple®. The applications may be installed from an application store in accordance with user operations on the mobile device 120. The applications 32 optionally include a scanning application for reading a machine-readable code, such as a barcode. The applications also include a shopping application 32 which is coded to perform steps of the method described below performed by the mobile device 120.

A method of ordering a print product will now be described with reference to FIG. 6. At step S1010 the user approaches the user terminal (self-service POS device) in the shop and initiates the product customisation process by engaging with the user terminal 130. The user terminal 130 displays a network address associated with the network storage device 140 along with a unique session identifier ("ID") for the user. The unique session identifier for the user is generated by the user terminal 130 in response to a user's initial interaction with the user terminal 130. In another embodiment the session identified is generated following the end of a previous customer's interaction with the user terminal 130. In an alternative embodiment, the unique session identifier may be generated by the network storage device 140 and sent to the user terminal 130. The user terminal 130 displays the network address and session ID in a user interface on a display of the user terminal 130 for input into the mobile device 120. In one example, the unique session ID is randomly generated, i.e. not sequentially generated. The session ID may represent a storage location at the network address.

In one example, the network address is a universal resource locator (URL) for directing the user's mobile device 120 to a web page served by the network storage device 140. The network address and session identifier are provided on the display means encoded in a visually displayed machine-readable code such as a barcode, a QR code, or other machine-readable code. An example display can be seen in FIG. 1 on user terminal 130. In step S1020, the user employs the scanner application on the mobile device 120 to read the barcode and retrieve the network address information and session ID. In particular, the visually displayed machine-readable code can be read using a camera or the like on the mobile device 120 and does not form a network connection with the user terminal 130. In an alternative embodiment, the scanning function of the scanning application may be incorporated into the shopping application 32 for use with the media transfer system.

Upon retrieving the network address (URL) the mobile device 120 requests a media upload page from the network storage device 140 at the network address. The user may then upload in step S1030 any desired media files, e.g. photos, that they wish to incorporate into a photo-customised product from the store. The photos are stored on the user's mobile device 120 in advance and are to be used (subsequently) to customise a product that the user orders from the user terminal 103. The mobile device 120 may use a web browser or a dedicated application to upload media to the network storage device 140. The files are uploaded in association with the session ID. In one implementation, The session ID effectively forms a unique identifier for a folder on the network storage device. The network id (URL)+session ID are concatenated to create a unique file upload path to which the files will be uploaded to. The files are uploaded using HTTP multi-part POST requests. This is just one example and there are many other ways of uploading the files from the mobile device 120 to the network storage device 140.

While the user is uploading images to the network storage device 140, the user terminal 130 polls, or interrogates, the network storage device 140 for any media files, e.g. images, uploaded under the corresponding session ID. In the particular implementation mentioned in the previous paragraph, the user terminal 130 will repeatedly poll for the arrival of new files at the unique path and on discovery they'll be automatically downloaded for use by the user terminal 130. The polling by the user terminal 130 may take place continuously or in response to a particular user interaction with the user interface of the user terminal 130. For example, the user could press a button labelled 'download images now' on the user interface of the user terminal 130 (not illustrated). The user terminal 130 downloads from the network storage device 140 any media files matching the session ID provided (i.e. displayed) to the user. Once the desired media files 134 have been successfully downloaded by the user terminal 130 from the network storage device 140, the user engages the user terminal 130 to choose, modify and apply the chosen media files 134 to a desired customisable product 132.

Figure 4:
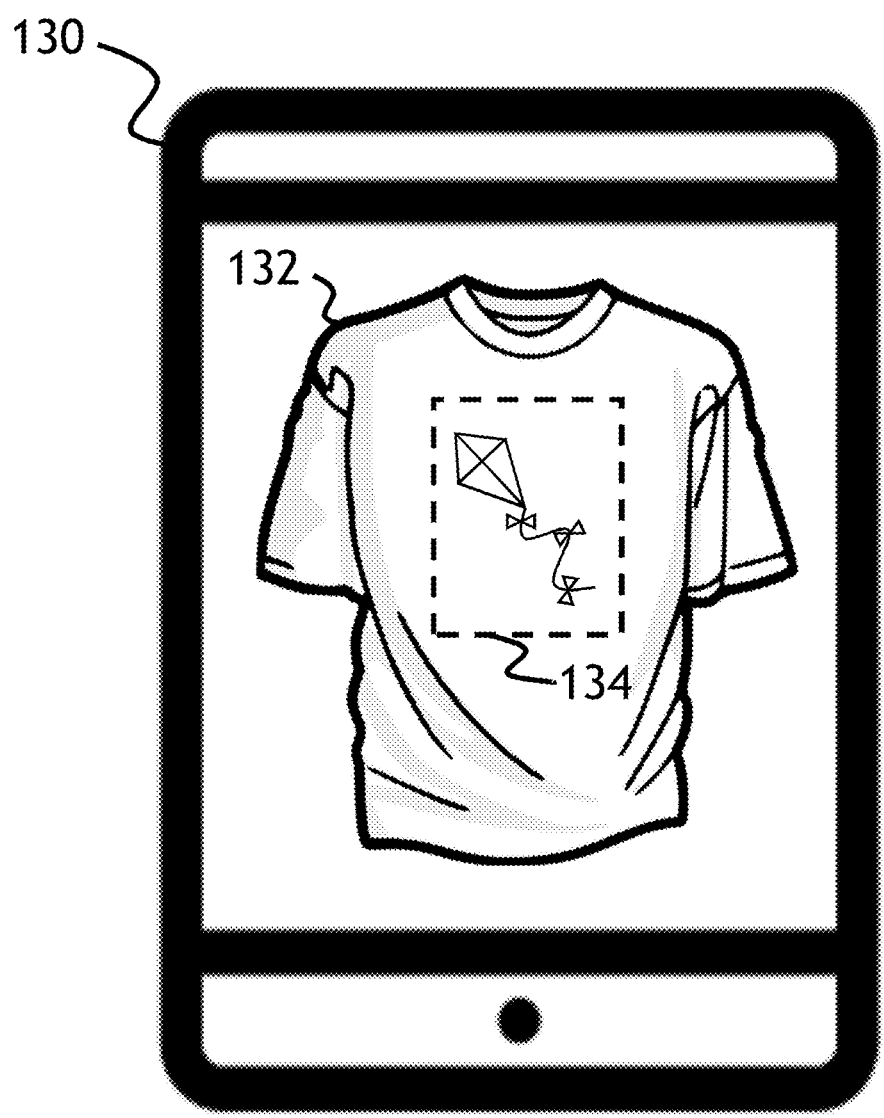
FIG. 4 shows an example user interface of the media transfer system.

Software on the user terminal is configured to guide the user through a customised product purchase process in which a product, such as a mug or T-shirt, is customised with a user's photograph. FIG. 4 shows an example customisation interface, wherein the user desires to print media, i.e. an image of a kite 134, onto a customisable product, i.e. a t-shirt 132.

Figure 5:
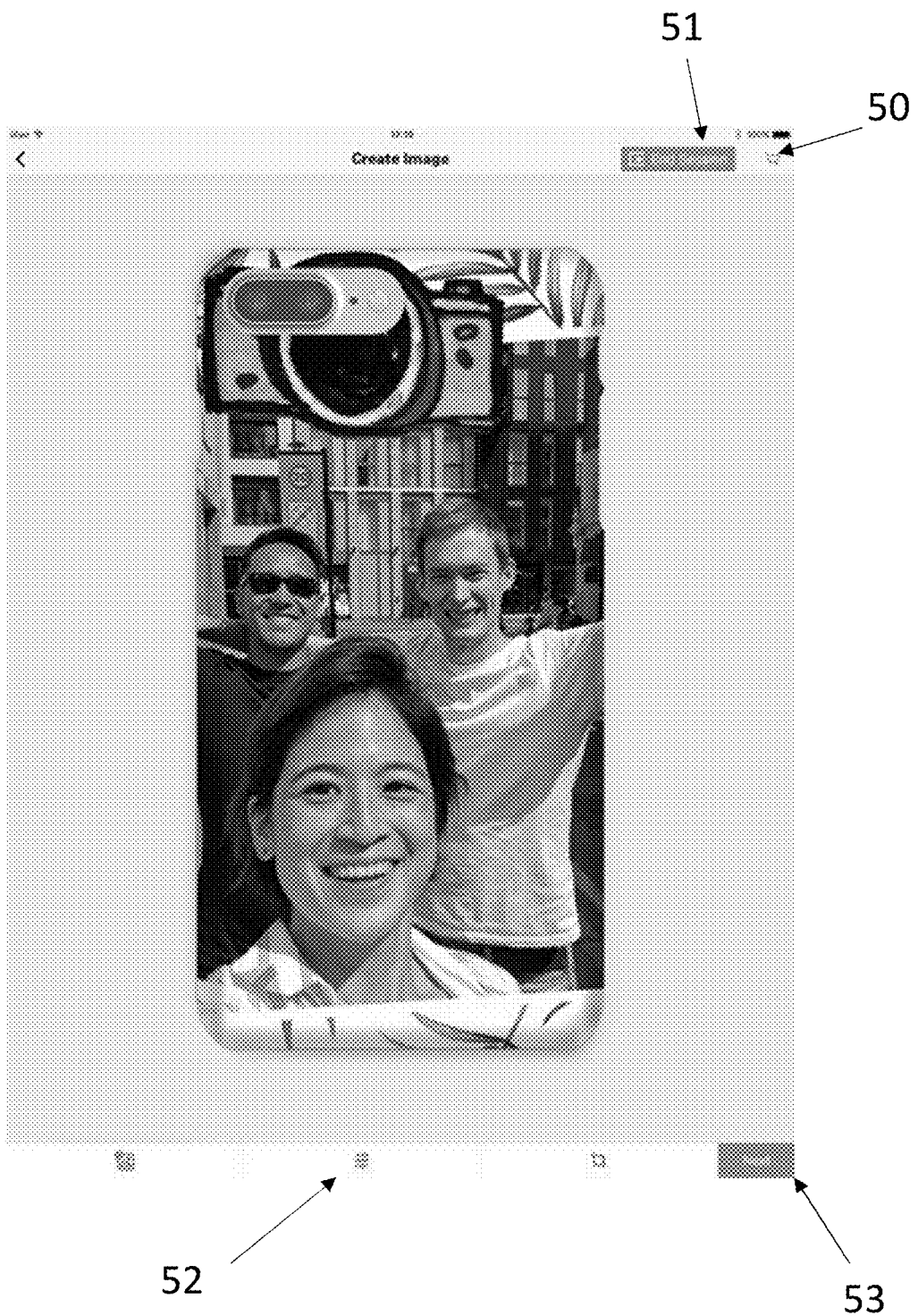
FIG. 5. shows a further example user interface of the media transfer system.

FIG. 5 shows another example customisation interface. In this example, the product being customised is a mobile phone case. The center of the interface shows the customised mobile phone case, which includes a photo retrieved by the user terminal 130 from the network storage device 140. At the bottom of the interface are controls 52 that allow a user to edit the customised product, such as adjust the position of the photograph relative to the mobile phone case, adjust image properties such as exposure, white balance, etc., or crop the image. This list of adjustments is not exhaustive and other editing tools could be provided according to requirements. At the bottom right-hand corner of the customisation interface is provided a 'next' button to advance the user through a guided work flow for customising the product. On the top of the interface is provided a 'end session' button that allows a user to exit the customised product ordering process. This allows a user of the user terminal 130 to leave the product ordering process without completing a purchase. In this case, any photos received from the user will be deleted (both at the user terminal 130 and the network storage device 140) and a new session ID will be generated as described later. A 'shopping cart' button 50 is provided which allows the user to exit the product customisation workflow and proceed to place an order immediately. In this case, the workflow moves to a purchase workflow in which payment and delivery details are taken from the user. Payment workflows are well known in the art and will not be described in detail here. Any suitable payment workflow including, for example, PayPal® may be used.

Once the customisation of the product 132, 134 and payment workflow is completed, the user terminal 130 uploads the customised product design from the user terminal 130 to the network storage device 140.

According to the first embodiment, the user's media files are securely transferred from a mobile device 120 to a user terminal 130 without the need to generate a direct connection between the mobile device and the user terminal. The user's media files are securely uploaded, downloaded and stored without the risk of them being accessible to other user's of the public user terminal. No data has been transmitted directly from the mobile device to the user terminal 130. Further, because the method takes advantage of existing network connections (the mobile device 120 being connected to a cellular or wi-fi network and the user terminal 130 being connected to a wi-fi network) the user does not need to take steps to configure any new connections when shopping from the user terminal 130. Once the user has uploaded the photos from his or her mobile device 120 to the network storage device 140 the user can execute the ordering process using the user terminal 130. This provides an improved user experience because in many embodiments the display of the user terminal will be larger and easier to use than the display of the mobile device 120.

Figure 6:
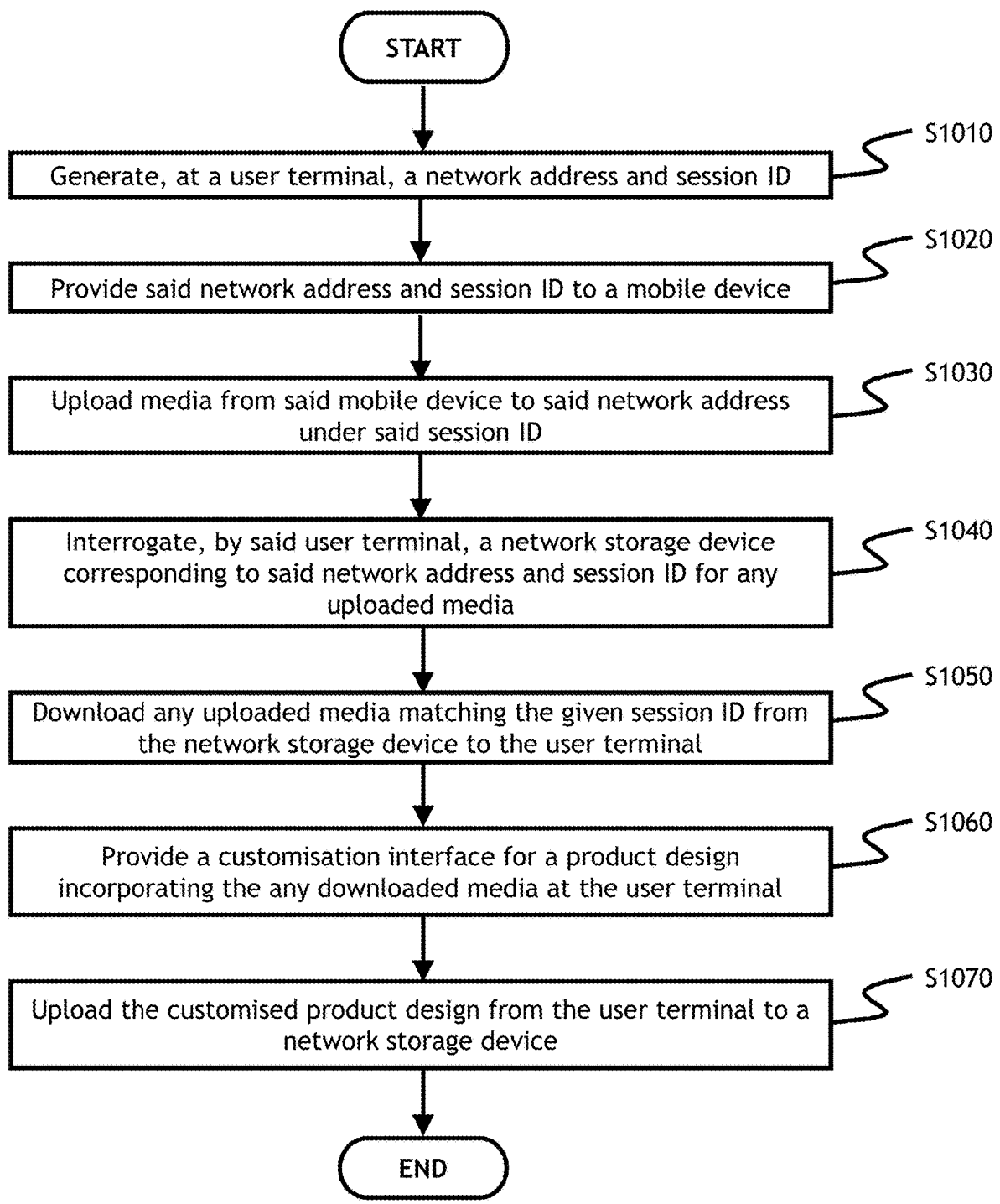
FIG. 6 is a flowchart of a method of operating a media transfer system according to the first embodiment.

In summary FIG. 6 shows a flow-chart for a method according to the first example.

In step S1010, a user terminal generates a network address and session ID for use by a user.

In step S1020, the network address and session ID is provided to a mobile device.

In step S1030, media from said mobile device is uploaded to the network address provided by the user terminal, under said session ID.

In step S1040, the user terminal interrogates a network storage device corresponding to said network address and session ID for any uploaded media.

In step S1050, any uploaded media matching the given session ID from the network storage device is downloaded to the user terminal.

In step S1060, a customisation interface is provided at the user terminal for product design incorporating the downloaded media.

In step S1070, the customised product design is uploaded from the user terminal to a network storage device.

Although not described in detail in connection with the first embodiment, the customised product design uploaded to and stored in the network storage device 140 may be manually retrieved from the network storage device 140 and the user's order fulfilled. In this way, the T-shirt customised with the kite image will be delivered to the customer later.

Once the upload step S1070 is completed, the user completes the transaction and the user interface on the user terminal is reset. At this stage any user photos stored on the user terminal 130 are discarded. Importantly, the process repeats and S1010 is performed again to generate a new session ID, which is unique and different from the previous session ID. The network address is unchanged. In this way, if a further customer approaches the user terminal to perform a new product customisation transaction, the new customer uses a different session ID allowing customer orders to be distinguished and any photos sent to the user terminal by the first customer are not available to the further customer thereby maintaining the privacy of customer photographs.

Figure 7:
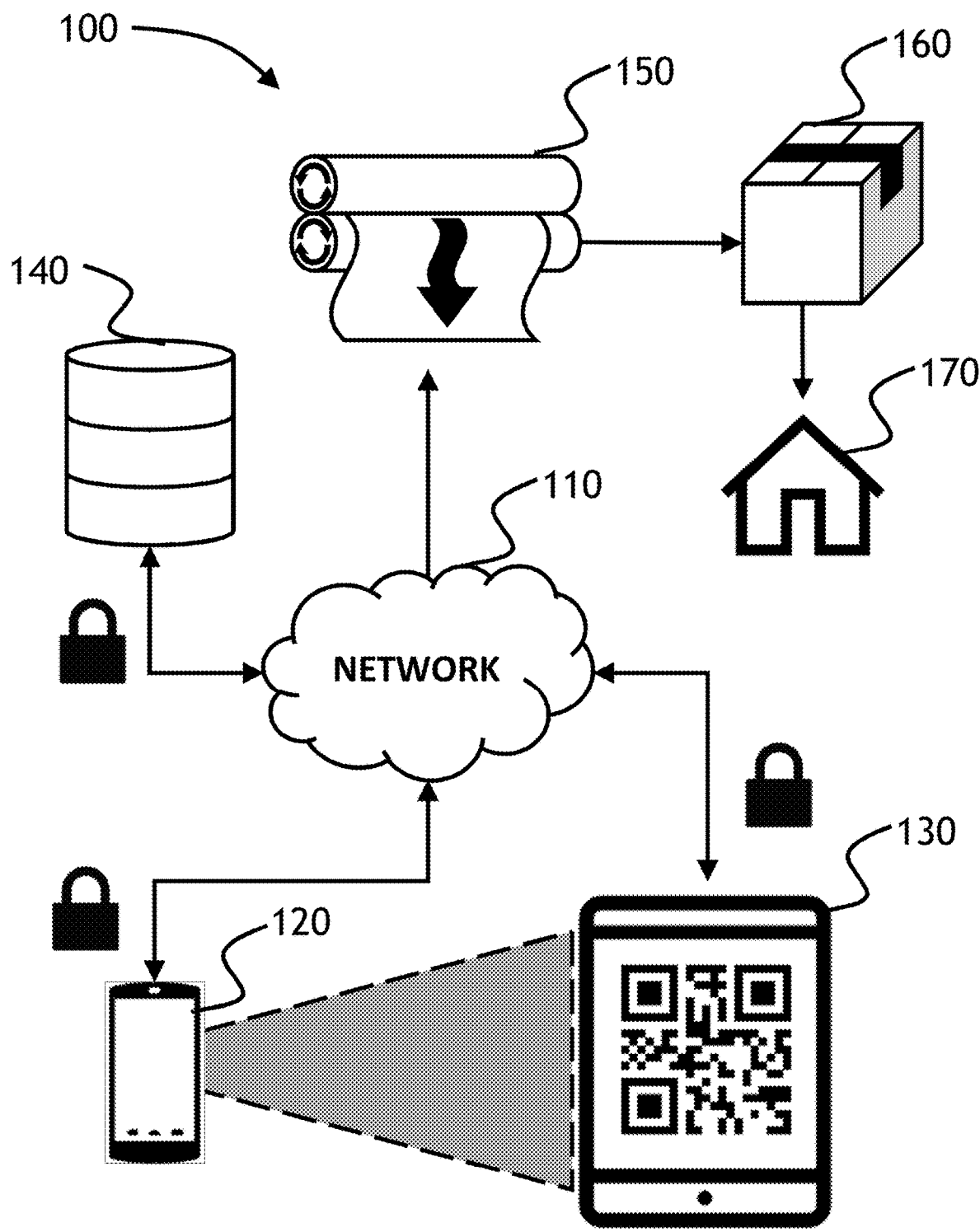
FIG. 7 is a schematic diagram of a media transfer system according to a second embodiment.

FIG. 7 shows a second embodiment of the invention which incorporates all of the features of the first embodiment, and additional features beyond. The mobile device 120, user terminal 130, and network storage 140 operate as previously described in connection with the first embodiment so that a customised product design is stored in the network storage device 140.

As shown in FIG. 7, the network communications between any of the mobile device 120 or the user terminal 130, and the network storage device 140 may be encrypted. This may be achieved by using end-to-end encryption, ensuring the security of any private media files whilst using a public user terminal (e.g. https).

Further to the first example discussed above, once the customisation of the product is complete and the user terminal 130 uploads the customised product design back to the network storage device 140, the printing process may begin. In the second embodiment, the completed customised product design is transmitted from the network storage device 140 to a printing device or print room 150. A print room is a third party printing provider to which files are sent for printing. The printing device or print room 150 may be selected from a plurality of printing devices or print rooms, depending on the nature of the customisable item to be printed upon. For example, a different printing device or print room 150 will be used to print onto a t-shirt, than that used to print onto placemats. The printing device or print room operator 150 prints the desired user media 134 onto the chosen product 132, e.g. the user's photo of a kite onto a t-shirt.

Once the customised product has been produced, it can be dispatched 160 to a destination 170 of the user's choice. The destination 170 may be inputted into the user terminal 130 during the customisation process.

Whilst the mobile device 120 and user terminal 130 are expected to be located nearby each other (so as to allow easy transmittal of the network address and session ID from the user terminal 130 to the mobile device 120), the network storage device 140 and printing device 150 may be located remotely and separately from each other.

Figure 8:
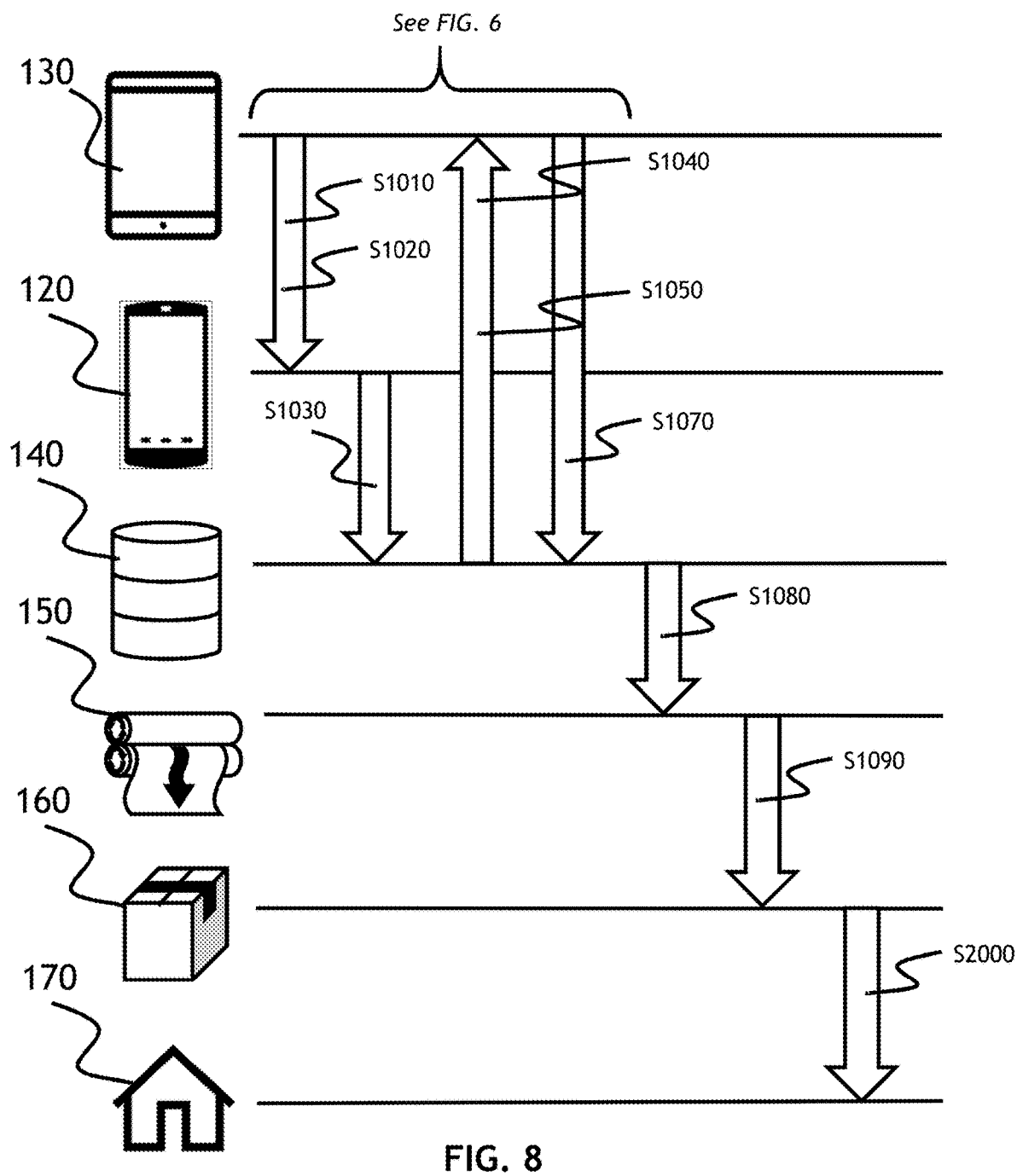
FIG. 8 is a schematic diagram of information and product exchanges between the network system components shown in FIG. 7.

FIG. 8 shows information and product exchanges between the system components shown in FIG. 7. Steps S1010-S1070 correspond to the method steps shown in FIG. 6. As can be seen, no data is transmitted directly from the mobile device 120 to the user terminal 130. Instead, the user terminal 130 generates a unique session ID and network location for the mobile device 120 to be directed to S1010, and provides (i.e. displays) the network address and session ID to the mobile device S1020. The mobile device 120 uploads the desired media to the network storage device 140 corresponding to the network address, and under the given unique session ID S1030. The user terminal 130 may then interrogate the network storage device 140 and download the media corresponding to the unique session ID S1040, S1050 directly from the network storage device 140.

A customisation interface is provided (i.e. displayed) at the user terminal 130 for product design incorporating the downloaded media and in step S1070, the completed customised product design is uploaded from the user terminal to a network storage device 140.

In Step S1080, the network storage device 140 transmits the customised product design information to the printing device 150.

In Step S1090, the printing device 150 produces the customised product, and it is prepared for dispatch 160.

In Step 2000, the customised product is dispatched 160 to the user defined location of choice 170, such as the user's home.

In the first and second embodiment, the network address and unique session identifier are received by the mobile device 120 from the user terminal 130 by reading a machine-readable code. Although this is a preferred embodiment, the invention could be implemented by the user terminal 130 displaying the network address and unique session identifier on the user interface in human readable form and the user manually entering the network address and unique session identifier into the shopping application 32 on the mobile device 120 using a keyboard or similar data entry method on the mobile device 120. In a further embodiment, the network address+unique session identifier are combined to form a URL and the user is instructed to enter this directly into the browser on the mobile device bypassing the need for a dedicated shopping application.

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

While the present invention has been described with reference to certain examples, it is to be understood that the invention is not limited to the disclosed examples. The present invention can be implemented in various forms without departing from the principal features of the present invention. The scope of the following claims is to be accorded the broadest interpretation so as to encompass all such modifications and equivalent structures and functions.

The invention claimed is:

1. A media transfer system comprising:
a user terminal; and
a network storage device,
wherein the user terminal comprises:
one or more processors;
a user interface; and
one or more memories storing instructions, which when executed by the one or more processors, causing the user terminal to:
display a network address for the network storage device on the user interface; and
display a session ID on the user interface,
wherein the network storage device is adapted to receive media data uploaded from a mobile device in association with the session ID;
wherein the user terminal is further configured to:
interrogate the network storage device and download any media data uploaded from the mobile device, under the given session ID from the network storage device;
provide a customisation interface on the user interface to allow a user to customise a product design with any downloaded media data; and
upload the customised product design to the network storage device,
wherein the user terminal and network storage device are communicable via a network.

2. The media transfer system according to claim 1 comprising a printing device communicable over the network,
wherein the printing device is adapted to receive the customised product design from the network storage device using a given session ID, and print the customised product.

3. The media transfer system according to claim 1 wherein the network address comprises a URL.

4. The media transfer system according to claim 1 wherein the network address and session ID are displayed on the user interface of the user terminal in a machine-readable code.

5. The media transfer system according to claim 4 wherein the network address and session ID is provided in a barcode code format.

6. The media transfer system according to claim 5, further comprising the mobile device, the mobile device comprising an application for reading the machine-readable code and a file transfer function for uploading media data to the network storage device.

7. The media transfer system according to claim 1 wherein any data transfer via the network is encrypted.

8. A user terminal for a media transfer system, comprising:
   one or more processors;
   a user interface; and
   one or more memories storing instructions, which when executed by the one or more processors, causing the user terminal to:
   generate and display a network address and unique session ID on the user interface;
   interrogate a network storage device corresponding to said network address and session ID for any media, uploaded from a mobile device, stored in association with the session ID;
   download any media, uploaded from the mobile device, matching the given session ID from the network storage device;
   provide a customisation interface on the user interface for a product design incorporating the any downloaded media; and
   upload the customised product design to a network storage device.

9. A method of transferring media via a network, the method comprising:
   generating, at a user terminal, session ID;
   displaying, by said user terminal on a user interface of the user terminal, a network address of a network storage device and the generated session ID for reading by a mobile device;
   uploading, from said mobile device, media data to said network address in association with said session ID;
   interrogating, by said user terminal, the network storage device for any media data, uploaded from the mobile device, under the given session ID;
   downloading, by said user terminal, any media data, uploaded by the mobile device, matching the given session ID from the network storage device;
   providing, at said user terminal on the user interface, a customisation interface for a product design incorporating the any downloaded media data; and
   uploading the customised product design from the user terminal to a network storage device.

10. A non-transitory computer readable medium storing a program causing a computer to carry out the following instructions:
    generate a session ID;
    display a network address of a network storage device and the generated session ID on a user interface of the computer;
    interrogate the network storage device for any media, uploaded from a mobile device, stored in association with the session ID;
    download any media uploaded from the mobile device, matching the given session ID from the network storage device;
    provide a customisation interface on the user interface for a product design incorporating the any downloaded media; and
    upload the customised product design to a network storage device.

* * * * *